United States Patent [19]
Robertson

[11] Patent Number: 4,762,580
[45] Date of Patent: Aug. 9, 1988

[54] OPTICAL FIBRE SPLICE REINSTATEMENT SHEATHING

[75] Inventor: Alexander J. Robertson, Great Dunmow, Great Britain

[73] Assignee: STC PLC, London, England

[21] Appl. No.: 941,711

[22] Filed: Dec. 15, 1986

[30] Foreign Application Priority Data

Jan. 31, 1986 [GB] United Kingdom ............... 8602404

[51] Int. Cl.$^4$ .................. B65H 69/02; B29D 11/00
[52] U.S. Cl. ................................. 156/83; 156/158; 156/304.2; 264/1.5; 264/343
[58] Field of Search ............ 156/158, 159, 304.2, 156/304.3, 305, 83; 264/1.5, 343; 350/96.21; 65/4.2, 4.21, 4.3, 36

[56] References Cited

U.S. PATENT DOCUMENTS

| 4,216,004 | 8/1980 | Brehm et al. | |
| 4,404,010 | 9/1983 | Bricheno et al. | 65/4.2 |
| 4,410,561 | 10/1983 | Hart, Jr. | 156/98 X |

FOREIGN PATENT DOCUMENTS

| 3429626 | 2/1986 | Fed. Rep. of Germany | 350/96.21 |
| 0096902 | 7/1980 | Japan | 350/96.21 |

OTHER PUBLICATIONS

TODA et al., "Optical Fiber Cutting Tool and Automatic Splicing Machine", Sumitomo Elec. Tech. Rev., No. 19, Jan. 1980, pp. 85–91.

Primary Examiner—Michael W. Ball
Assistant Examiner—Geoffrey L. Knable
Attorney, Agent, or Firm—Lee & Smith

[57] ABSTRACT

A circularly symmetric reinstatement sheathed optical fibre splice butt joining the ends of two acrylate sheathed glass optical fibres is made by a method that includes the step of immersing the spliced fibres (14) in dichloromethane (64) to cause the acrylate to swell and longitudinally expand to close the gap (42) in the sheathing (41) left by the splicing process. The sheathing is clamped in this position while the solvent evaporates. The residual gap, which is comparable in length with the sheath diameter, is protected by the application of a drop of uncured resin which capillary forces constrain to assume a circularly symmetric form until the resin is cured.

7 Claims, 3 Drawing Sheets

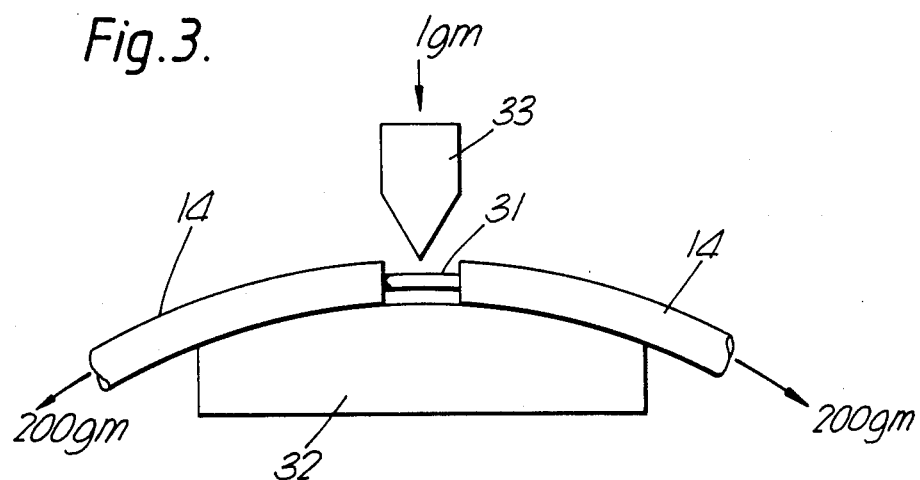
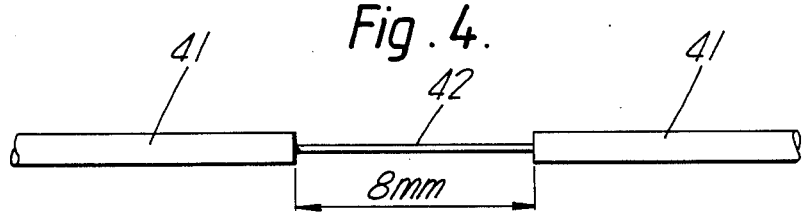
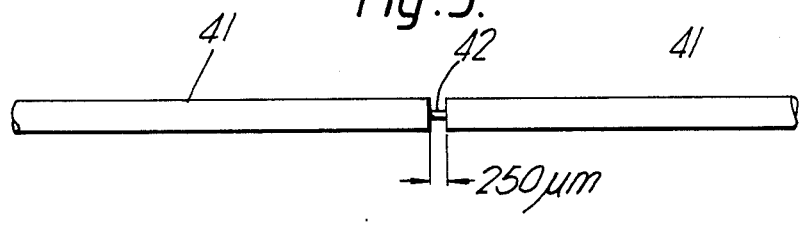

OPTICAL FIBRE SPLICE REINSTATEMENT SHEATHING

BACKGROUND OF THE INVENTION

This invention relates to a method of providing reinstatement sheathing to cover the exposed glass in the neighbourhood of a splice formed to butt join the ends of two plastics sheathed glass optical fibres.

Optical fibre is conventionally made by a batch process, and hence in the manufacture of long lengths of cable the or each optical fibre is liable to be composed of a number of shorter lengths of optical fibre joined end to end in a permanent manner. Such permanent points are referred to as splices, and the conventional form of such a splice is a fusion splice.

The initial strength of freshly drawn glass fibre is much reduced if it becomes scratched. Such scratching is very liable to occur if it is allowed to come into contact with almost any solid surface, and therefore it is conventional practice to coat such fibres with plastics protective sheathing immediately after they are drawn and before they come into contact with anything else.

To make a fusion splice, the protective plastics sheathing is stripped back a short distance from the end of each fibre to expose bare glass (silica) fibre. Each fibre end is provided by cleaving with a plane face normal to the fibre axis. The fibres are aligned, butted together, and then slightly separated for the striking of an arc between them. The ends are then advanced into the arc where they fuse together. In making such a splice it is necessary for the bare fibre to protrude from its plastics protective sheathing for a short distance so that no plastics material comes within the range of the arc where it would be liable to introduce contamination. Therefore, there is a gap in the protective sheathing extending a short distance on either side of the splice. It is necessary to fill this gap with reinstatement sheathing without letting the bare fibre become scratched.

One known method of providing reinstatement sheathing involves placing the splice in a U-shaped trough that is rather longer than the gap in the sheathing and just fits around the plastics sheathing. In this way a mould is formed whose sides are formed by the trough and whose ends are formed by the original plastics sheathing. Liquid resin is poured into this mould and cured. The drawback of this approach is that the resulting reinstatement sheathing, after withdrawal from the mould, does not have the same circularly symmetric profile as the original sheathing, but has a 'flat' terminating at each long side in a meniscus. This change of profile can introduce snagging problems when the plastics protected fibre is being cabled.

SUMMARY OF THE INVENTION

The present invention is concerned with a manner of providing reinstatement sheathing a feature of which is that it is able to provide a high degree of circular symmetry.

According to the present invention there is provided a method of providing reinstatement plastics sheathing to cover the exposed glass in the neighbourhood of a splice formed to butt join the ends of two plastics sheathed optical fibres, wherein the facing ends of the existing sheathing on either side of the butt join are arranged to be close enough for capillary action to cause a quantity of liquid that is applied between said facing ends to adopt a peripheral size and shape conforming to that of the sheathing, which liquid is cured to form the plastics reinstatement sheathing.

The invention further provides a method of providing reinstatement plastics sheathing to cover the exposed glass in the neighbourhood of a splice formed to butt join the ends of two plastics sheathed glass optical fibres, which method includes the steps of applying a liquid swelling agent to the plastics sheathing on either side of the exposed glass region to cause the sheathing to swell and thereby advance along the fibre to close the gap, of holding the ends of the sheathing in substantial abutment while the swelling agent is removed, of applying a quantity of liquid to fill the gap between the substantially abutted ends, and of curing said liquid to form said reinstatement sheathing.

According to an alternative aspect the invention provides a method of preparing the ends of a plastics sheathed glass optical fibre for splicing which method includes the steps of cutting into the sheathing and causing it to part by dragging one portion of the sheathing longitudinally with respect to the other to expose a length of bare fibre, and of longitudinally tensioning over a curved anvil that portion of the sheathed fibre that includes said length of bare fibre while applying a cleaving blade to a point on the surface of the bare fibre to cause the fibre to cleave, and wherein the length of bare fibre is both long enough to permit direct access of the cleaving blade to the fibre surface without contacting its sheath, and short enough to ensure that the bare fibre does not touch the anvil.

BRIEF DESCRIPTION OF THE DRAWINGS

There follows a description of the making of a fusion splice, and of the provision of reinstatement sheathing over that splice by a method embodying the invention in a preferred form. The description refers to the accompanying drawings in which:

FIG. 3 depicts a fibre cleaving jig;

FIGS. 4 and 5 depict a fibre splice respectively before and after extension of the sheathing on either side of the splice.

DETAILED DESCRIPTION OF A PREFERRED EMBODIMENT

Figure 1:
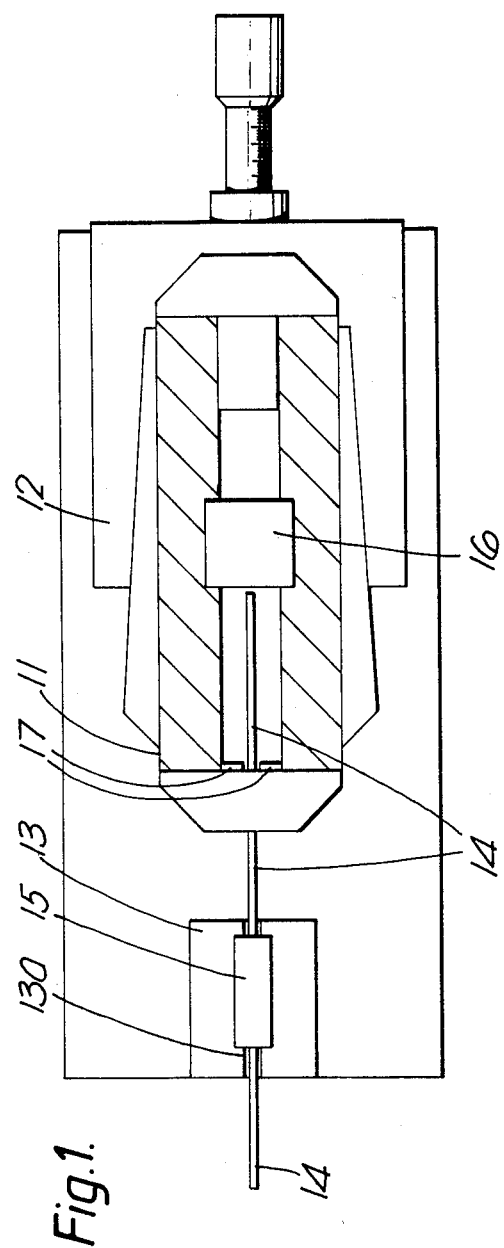
FIG. 1 depicts a sheath stripping jig.
Figure 2:
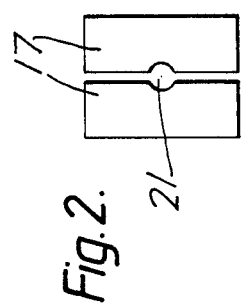
FIG. 2 depicts the shape of the blades of the jig of FIG. 1.

The first stage in the preparation of the ends of two acrylate-sheathed silica optical fibres, which possess an optical waveguiding structure within the silica, involves the use of a jig as depicted in FIG. 1. The basic elements of this jig are a fibre sheath stripping tool 11 mounted on a translation stage 12, and a fixed fibre clamping arrangement 13. In this example each silica fibre has a diameter of 125 microns, and its acrylate sheathing has an external diameter of 250 microns. To prepare a fibre 14 for splicing it is located by its sheathing, in a Vee-groove 13a formed in the lower part of the clamping arrangement 13 where it is held in position by the lowering of a pressure pad 15. The clamping is applied when the end of the fibre abuts a length stop 16 that forms part of the cutting tool 11 and is positioned so that the fibre protrudes about 30 mm into the tool beyond the plane of its cutting jaws 17. The shape of these jaws, which is depicted in FIG. 2, is such that when clenched they leave a central hole 21 that is 180 microns diameter. In this way they are capable of cutting a substantial way through the total thickness of the sheathing without risk of contacting the underlying silica.

The first cut is made with the fibre end abutting the length stop. The cutter jaws are released and then the translation stage 12 is used to wind the cutting tool back 4 mm before a second cut is made. This time the jaws are held clenched while the cutting tool is wound back a further 500 microns so as to drag the sheathing back and leave a small gap of exposed bare silica fibre in the region of the second cut. Owing to elastic effects, the 500 microns translation produces a somewhat shorter gap of about 300 microns.

The fibre 14, with the 300 microns gap 31 (FIG. 3) in its sheathing, is next removed from the jig of FIG. 1 and placed in a cleaving machine (FIG. 3) where it is tensioned at 200 grams over an anvil 32 which has a radius of curvature of 60 mm. The fibre 14 is located with the gap 31 in its sheathing positioned beneath a diamond blade 33. This blade is mounted on a lever (not shown) which is counterbalanced to give the blade an effective mass of 1 gram. When this is lowered on to the tensioned fibre this loading is sufficient to cause the fibre to cleave.

A feature of this cleaving method is that the length of bare fibre is so short that it does not touch the anvil, and indeed the only thing to touch the silica apart from the sheathing is the diamond blade, and this touches it only at the one point where it cleaves. The next step preparatory for fusion splicing is to strip off the 4 mm of sheathing lying between the first and second cuts in the sheathing made by the tool 11. This is achieved by dipping this portion of the sheathing into dichloromethane (DCM) which causes it to swell thereby loosening its grip upon the silica, and so enabling it to be removed by pulling it off with a pair of soft-jawed tweezers.

When the ends of two fibres have been prepared in this way, their extremities are cleansed ready for fusion splicing. Typically, this involves immersing them in concentrated sulphuric acid to a depth of about 2 mm for 10 minutes before washing in deionised water. The ends are then spliced using an electric arc discharge splicing machine (not shown). This leaves a single length of fibre as depicted in FIG. 4 with an 8 mm gap in the sheathing 41, wnere bare silica 42 is exposed. (The splice, which is not shown, occurs at the midpoint of this gap.) This gap is shrunk to distance of about 250 microns, as depicted in FIG. 5, by the application of DCM to the acrylate sheathing 41 on both sides of the bare silica 42. The DCM is absorbed by the acrylate which causes it to swell both radially and longitudinally. In the case of sheathing made of the acrylate coating designated Lankro 2280B, and also one made of that designated Desoto X131, it has been found that the immersion of about 20 to 25 mm of the sheathing on each side of the gap for about 30 seconds provides the requisite amount of longitudinal expansion to close the gap. If the sheathing were then removed from the DCM, and not restrained in any way, it would shrink back to substantially its former state as the absorbed DCM is lost by evaporation. On the other hand, if the abutting ends are lightly clamped while the DCM is allowed to evaporate, the amount of longitudinal relaxation is very small, and typically the gap that is left when the clamping is removed is only about 250 microns.

Figure 6:
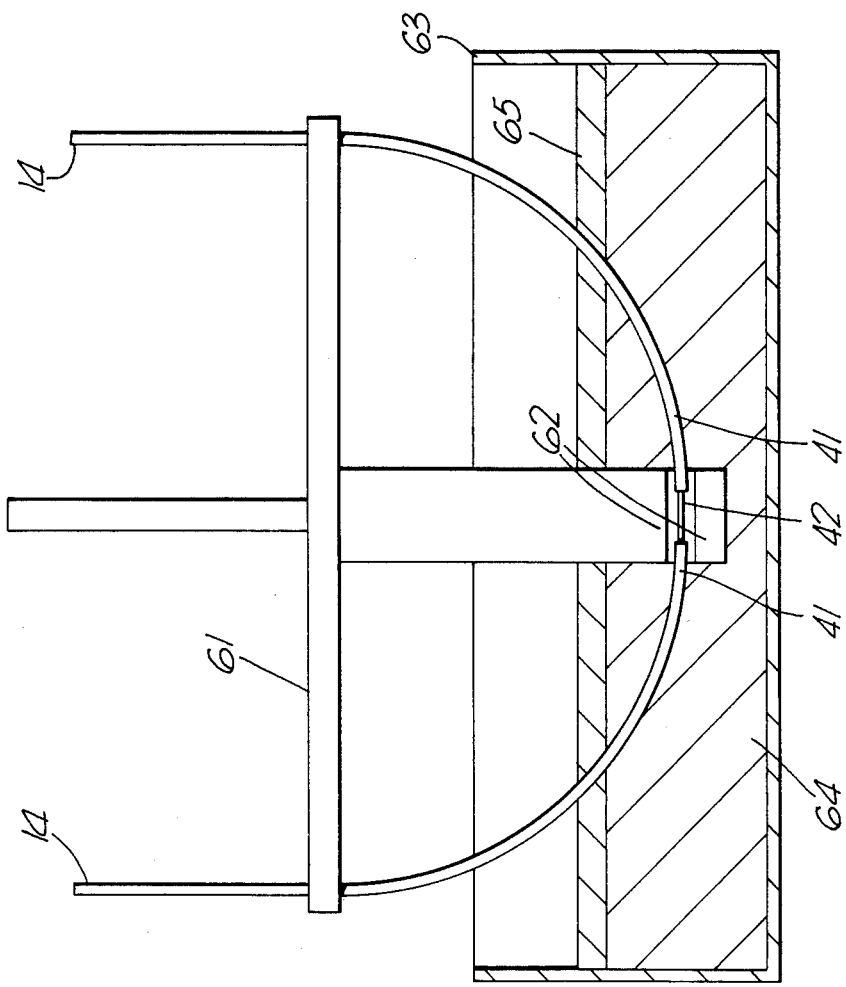
FIG. 6 depicts a sheath extension jig.

A jig suitable for performing this immersion and clamping is depicted in FIG. 6. The spliced fibre is clamped at each end of a cross-member 61 by its sheathing so as to form a U-bend. At the bottom of this U-bend the 8 mm gap in the sheathing where bare silica 42 is exposed lies within the extremities of a clamp 62 whose jaws are open. The jig is lowered into a glass dish 63 containing a quantity of DCM 64 on which is floated a layer 65 of water to inhibit evaporation. When the resulting expansion of the sheathing is observed to have caused the two portions of sheathing to contact each other, the clamp 62 is tightened and then the assembly is withdrawn from the dish to allow the absorbed DCM to be lost by evaporation while clamp 62 is held in its tightened state. Evaporation rate can conveniently be speeded up by use of gentle heating, for instance by a hand hot draught of air from a hot air fan applied equally to the region on each side of the claimp for a total time of about a minute. Then clamp 62 is released and the spliced fibre is removed from the jig. At this stage the fibre has the general appearance depicted in FIG. 5, with a gap of about 250 microns between the two length of sheathing. The portions of sheathing that have been stretched are approximately 10 microns thinner than the unstretched portions. The residual gap is filled by the application of liquid resin dispensed from the tip of a hypodermic syringe where it is held by capillary forces until solidified by curing with ultra-violet light.

While the foregoing specific description has related particularly to the use of DCM as the swelling agent for use with acrylate coated fibres it will be understood that the swelling of a plastics material that occurs upon absorption of certain solvents is not peculiar to acrylates, and that therefore the invention is applicable not only to the reinstatement sheathing of acrylate sheathed optical fibres, but also to the reinstatement sheathing of fibres sheathed with other types of plastics materials. It will also be appreciated that, particularly in the case of fibre sheathed with other plastics materials, the use of a different chemical as swelling agent may be indicated.

I claim:

1. A method of joining the ends of two plastics sheathed optical fibres each of which consists of an optical fibre encased in a plastics sheath, which method includes the steps of stripping a length of the plastics sheath from the end of each plastics sheathed fibre to expose a length of bare fibre protruding from an end face of the plastics sheath, of forming a butt join between the ends of the two protruding lengths of bare fibre, of advancing said end face of the plastics sheath of each of the two fibres towards each other along their respective lengths of bare fibre so that said end faces are brought close enough to define a gap whose size is such that, if a quantity of liquid is applied to that gap, capillary action will cause the liquid to adopt a peripheral size and shape conforming to that of the plastics of the fibre, of applying a quantity of liquid uncured resin to the gap sufficient to fill the gap, and of curing the applied liquid uncured resin to form a length of reinstatement plastics sheathing bridging the gap between the ends faces and conforming in peripheral size and shape to that of the plastics sheath of the fibre.

2. A method of joining the ends of two plastics sheathed optical fibres which method is as claimed in claim 1 and wherein said step of advancing the end face of each of the two fibres along their respective lengths of bare fibres is accomplished by the application of a liquid swelling agent to the plastics sheath of each fibre in a region adjacent said end face of its sheath, and wherein the advanced ends are physically held advanced while the liquid swelling agent is removed and while said steps of applying a quantity of uncured resin and curing that applied resin are performed.

3. A method as claimed in claim 2, wherein the plastics sheath of each fibre is made of an acrylate plastics material.

4. A method as claimed in claim 3 wherein the liquid swelling agent is dichloromethane.

5. A method of forming a reinstatement sheathed optical fibre splice butt joining the ends of two plastics sheathed optical fibres each of which consists of a glass optical fibre encased in a plastics sheath, which method includes the steps of preparing one end of each of the two fibres for splicing, wherein said preparing step includes the steps of cutting into the sheath of each fibre and parting the sheath by dragging the portion of the sheath on one side of the cut longitudinally with respect to the portion on the other side of the cut to expose a length of bare fibre, of longitudinally tensioning over a curved anvil that portion of the sheathed fibre that includes said length of bare fibre and of cleaving the fibre by applying a cleaving blade to a point on the surface of the bare fibre while it is thus tensioned over the anvil, wherein the length of bare fibre exposed by said dragging of the one portion of the sheath longitudinally with respect to the other is both long enough to permit direct access of the cleaving blade to the fibre surface without contacting its sheath, and short enough to ensure that the bare fibre does not touch the anvil;

forming a splice between a cleaved end of one fibre and a cleaved end of the other fibre, which splices leaves a length of bare fibre that includes the splice extending between the end of the sheath of one fibre and that of the sheath of the other fibre;

advancing the ends of the sheaths of the two fibres towards each other along the length of bare fibre that includes the splice so that said ends are brought close enough to define a gap whose size is such that, if a quantity of liquid is applied to that gap, capillary action will cause the liquid to adopt a periheral size and shape conforming to that of the plastics of the fibre, applying a quantity of liquid uncured resin to said length of bare fibre that includes the gap, and curing said applied resin to form reinstatement sheathing bridging the region between the sheath of one fibre and that of the other, wherein the advancement of the ends of the sheaths of the two fibres and the amount of liquid uncured resin applied are such that capillary action causes the uncured resin to adopt a peripheral size and shape conforming to that of the plastics sheaths of the two fibres.

6. A method as claimed in claim 5 wherein said step of advancing the ends of sheaths is accomplished by the application of a liquid swelling agent to the sheaths in regions adjacent their proximal ends.

7. A method as claimed in claim 5 wherein the sheaths are made of an acrylate plastics material and the liquid swelling agent is dichloromethane.

* * * * *